United States Patent
Tsien et al.

(10) Patent No.: US 7,346,364 B1
(45) Date of Patent: Mar. 18, 2008

(54) POWER AND DATA RATE CONTROL IN A MULTI-RATE WIRELESS SYSTEM

(75) Inventors: Chih C. Tsien, San Diego, CA (US); Jiewen Liu, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 604 days.

(21) Appl. No.: 10/696,687

(22) Filed: Oct. 29, 2003

(51) Int. Cl.
*H04B 7/00* (2006.01)

(52) U.S. Cl. .................... 455/522; 455/69; 455/70; 370/318

(58) Field of Classification Search ............... 455/522, 455/41.2, 69, 70; 370/318
See application file for complete search history.

(56) References Cited

U.S. PATENT DOCUMENTS

| | | | |
|---|---|---|---|
| 5,465,398 A * | 11/1995 | Flammer | 455/69 |
| 6,173,159 B1 * | 1/2001 | Wright et al. | 455/66.1 |
| 6,904,021 B2 * | 6/2005 | Belcea | 370/252 |
| 7,023,824 B2 * | 4/2006 | Khullar | 370/337 |
| 2002/0154611 A1 * | 10/2002 | Khullar | 370/329 |
| 2003/0003905 A1 * | 1/2003 | Shvodian | 455/423 |
| 2003/0013451 A1 * | 1/2003 | Walton | 455/447 |
| 2003/0100328 A1 * | 5/2003 | Klein et al. | 455/522 |
| 2005/0030244 A1 * | 2/2005 | Durham et al. | 343/795 |
| 2005/0030976 A1 * | 2/2005 | Wentink | 370/473 |
| 2005/0250528 A1 * | 11/2005 | Song et al. | 455/522 |

\* cited by examiner

*Primary Examiner*—Edward F. Urban
*Assistant Examiner*—Fayyaz Alam
(74) *Attorney, Agent, or Firm*—The Law Offices of John C. Scott, LLC; John C. Scott (57) ABSTRACT

Transmit parameters are adjusted for a wireless device based on link margin. In at least one embodiment, link margin is calculated as a difference between a received power level and receiver sensitivity.

20 Claims, 5 Drawing Sheets

POWER AND DATA RATE CONTROL IN A MULTI-RATE WIRELESS SYSTEM

FIELD OF THE INVENTION

The invention relates generally to wireless communication and, more particularly, to methods and structures for controlling transmit parameters within a wireless system.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
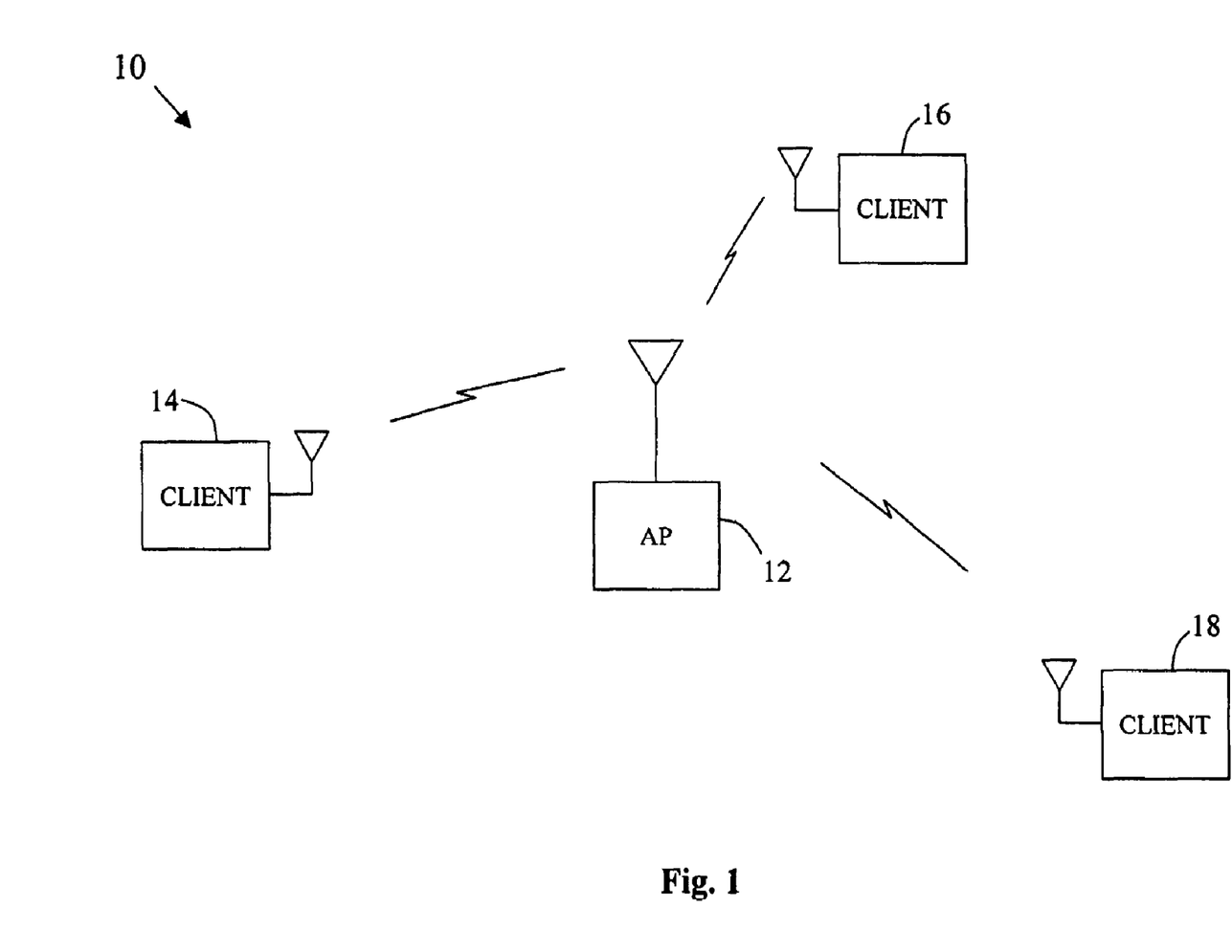
FIG. 1 is a block diagram illustrating an example wireless network arrangement in which embodiments of the present invention may be practiced.

FIG. 1 is a block diagram illustrating an example wireless network arrangement 10 in which embodiments of the present invention may be practiced. As illustrated, the wireless network arrangement 10 may include a wireless access point 12 and a number of wireless client devices 14, 16, 18. The wireless access point 12 provides wireless access to the corresponding network for the wireless client devices 14, 16, 18. Although illustrated with three wireless client devices, it should be appreciated that any number of client devices may access a network through an access point at a particular time. Each of the wireless client devices 14, 16, 18 may transmit data to the access point 12 and receive data from the access point 12 through a corresponding wireless channel. As illustrated, each of the client devices 14, 16, 18 being serviced by the access point 12 may be located at a different distance from the access point 12 than the other client devices. Also, one or more of the client devices 14, 16, 18 may be in motion while it is communicating with the access point 12. As a client device gets farther away from the access point 12, the quality of the corresponding wireless link may decrease. For example, the signal-to-noise ratio (SNR) of a received signal will typically decrease as the signal strength of the signal grows smaller due to the increased distance. Also, other events may occur that can adversely affect the quality of a wireless link. For example, a client device may move to a location that is partially blocked from the access point 12 (e.g., behind a wall, etc.) or an object or individual may move to a location that is between the client device and the access point.

In many wireless networking standards, the transmit power level of the client devices remains fixed during network operation. Thus, client devices that are relatively close to an access point may transmit at the same power level as client devices that are relatively far from the access point. The client devices that are close may therefore transmit at a power level that is much greater than necessary for accurate communication. Likewise, the client devices that are far away from the access point (and/or client devices that are blocked in some manner) may not generate a strong enough signal to reach the access point. To overcome such problems, power control methods have been proposed to allow the transmit power level of client devices to adapt to the present condition of the channel. Most of the wireless LAN devices now available, however, do not have transmit power control capabilities. The present invention relates to techniques and structures that allow open loop control methods to be used within a wireless network or other wireless communication system to control transmit parameters therein. In an open loop approach, the transmit parameters of a wireless device can adapt to present channel conditions without knowing related information about the other side of the communication.

In at least one embodiment of the present invention, the transmit parameters of a wireless device are adapted based upon a link margin determined for the device. That is, a link margin may be calculated for a wireless device and used to select, for example, a transmit power level, a transmit data rate, and/or other transmit parameter values for the device. As used herein, the phrase "wireless device" is intended to encompass any type of device that has wireless communication capability and may include, for example, a wireless client device for use in a wireless network, a laptop, desktop, palmtop, or tablet computer having wireless networking capability, a personal digital assistant (PDA) having wireless networking capability, a pager, a cellular telephone or other handheld wireless communicator, a wireless network interface card (NIC) or other wireless network interface structure, and/or others.

Figure 2:
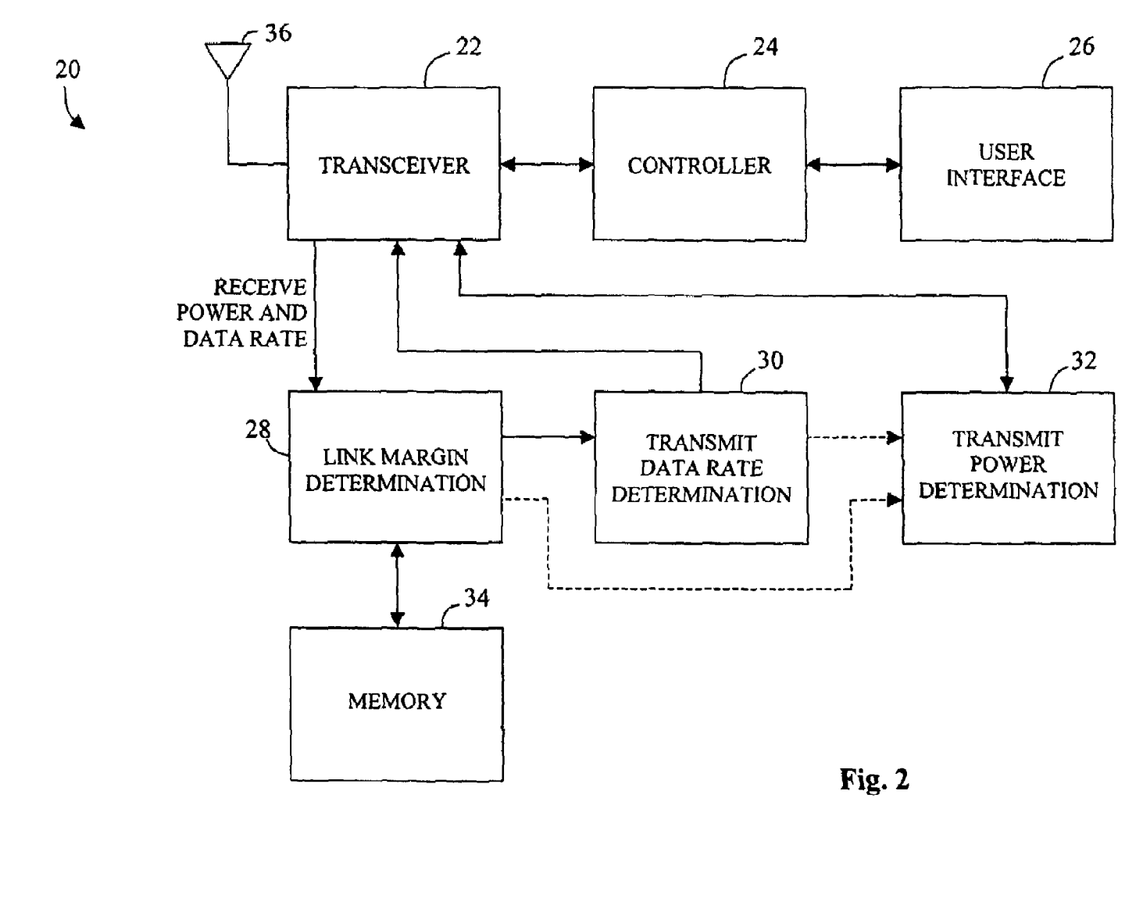
FIG. 2 is a block diagram illustrating an example wireless device in accordance with an embodiment of the present invention.

FIG. 2 is a block diagram illustrating an example wireless device 20 in accordance with an embodiment of the present invention. As illustrated, the wireless device 20 may include one or more of: a wireless transceiver 22, a controller 24, a user interface 26, a link margin determination unit 28, a transmit data rate determination unit 30, a transmit power determination unit 32, a memory 34, and an antenna 36. The wireless transceiver 22 is operative for supporting wireless communication with a remote wireless entity (e.g., a wireless access point or other wireless device) via antenna 36. The transceiver 22 may be configured to operate in accordance with one or more wireless standards which may include, for example, the IEEE 802.11 wireless networking standard (ANSI/IEEE Std 802.11-1999 Edition) and its related standards (e.g., the IEEE 802.11a standard (IEEE Std 802.11a-1999), etc.), other wireless networking standards, cellular standards, and/or others. The antenna 36 may be any type of antenna including, for example, a dipole, a patch, a helical antenna, an antenna array, and/or others. In at least one embodiment, multiple antennas are provided in an antenna diversity arrangement. The controller 24 is operative for controlling the operation of the wireless device 20. The user interface 26 provides an interface between a user of the wireless device 20 and the controller 24.

The link margin determination unit 28 calculates a link margin for the wireless device 20 to be used in determining appropriate transmit parameters for the device 20. Link margin may be defined as a relationship between a current received power and a power that is required to achieve a predetermined performance level or communication quality within a communication link. In at least one embodiment of the present invention, link margin is determined by calculating a difference between a present received power level and a receiver sensitivity of the wireless device 20. The link margin determination unit 28 may obtain an indication of a present received power level from, for example, the transceiver 22. In an IEEE 802.11 compatible device, for example, the link margin determination unit 28 may obtain a received power level (RPL) parameter value from the transceiver 22 for use in determining link margin. The link margin determination unit 28 may estimate a receiver sensitivity value for the transceiver 22, use a factory calibrated value, or pre-determine receiver sensitivity in some other fashion. In one possible approach, the link margin determination unit 28 obtains a data rate of a signal received by the transceiver 22 (e.g., a beacon signal received from an access point, etc.) and then selects a receiver sensitivity value for use in calculating link margin from a table based on the data rate. The table may be stored, for example, within the memory 34. Table I below is an example of a table that may be used for this purpose.

TABLE I

| Rate | Estimated Sensitivity |
|---|---|
| 6 | −82 |
| 9 | −81 |
| 12 | −79 |
| 18 | −77 |
| 24 | −74 |
| 36 | −70 |
| 48 | −66 |
| 54 | −64 |

Once values have been obtained for the received power level and the receiver sensitivity, the link margin determination unit 28 may calculate the link margin by determining the difference of the two values. Other techniques for calculating link margin (e.g., determining a ratio, etc.) may alternatively be used. The link margin value may then be delivered to the transmit data rate determination unit 30 which may use the link margin value to determine a transmit data rate for the wireless device 20. In general, the higher the calculated link margin, the higher the data rate that will be selected by the transmit data rate determination unit 30. In one possible approach, a number of link margin ranges are defined and each range is assigned a corresponding transmit data rate value. The transmit data rate determination unit 30 may then determine which range the calculated link margin value falls within and deliver the corresponding transmit data rate value to the transceiver 22.

The transmit power determination unit 32 may also receive an indication of the link margin and use it to adjust a transmit power level for the wireless device 20. In at least one embodiment, if the link margin is greater than a predetermined threshold value, the transmit power determination unit 32 may enter a power reduction loop that is designed to reduce the transmit power of the wireless device 20 to a level that is lower but still adequate to support wireless communication. The link margin determination unit 28, the transmit data rate determination unit 30, and the transmit power determination unit 32 may each operate in a continuous or repetitive fashion so that the transmit power level and/or transmit data rate may adapt to the changing channel conditions between the wireless device 20 and the remote wireless entity. In at least one embodiment of the present invention, only a single transmit parameter is adjusted based on link margin. Thus, the wireless device 20 may be modified to include only the transmit data rate determination unit 30 or only the transmit power determination unit 32.

It should be appreciated that the individual blocks illustrated in FIG. 2 (and in other block diagrams herein) may be functional in nature and do not necessarily correspond to discrete hardware elements. For example, in at least one embodiment, two or more of the blocks are implemented in software within a single (or multiple) digital processing device(s). The digital processing device(s) may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Hardware, software, firmware, and/or hybrid implementations may be used. With reference to FIG. 2, in at least one embodiment, the link margin determination unit 28, the transmit data rate determination unit 30, and/or the transmit power determination unit 32 are implemented within the controller 24.

Figure 3:
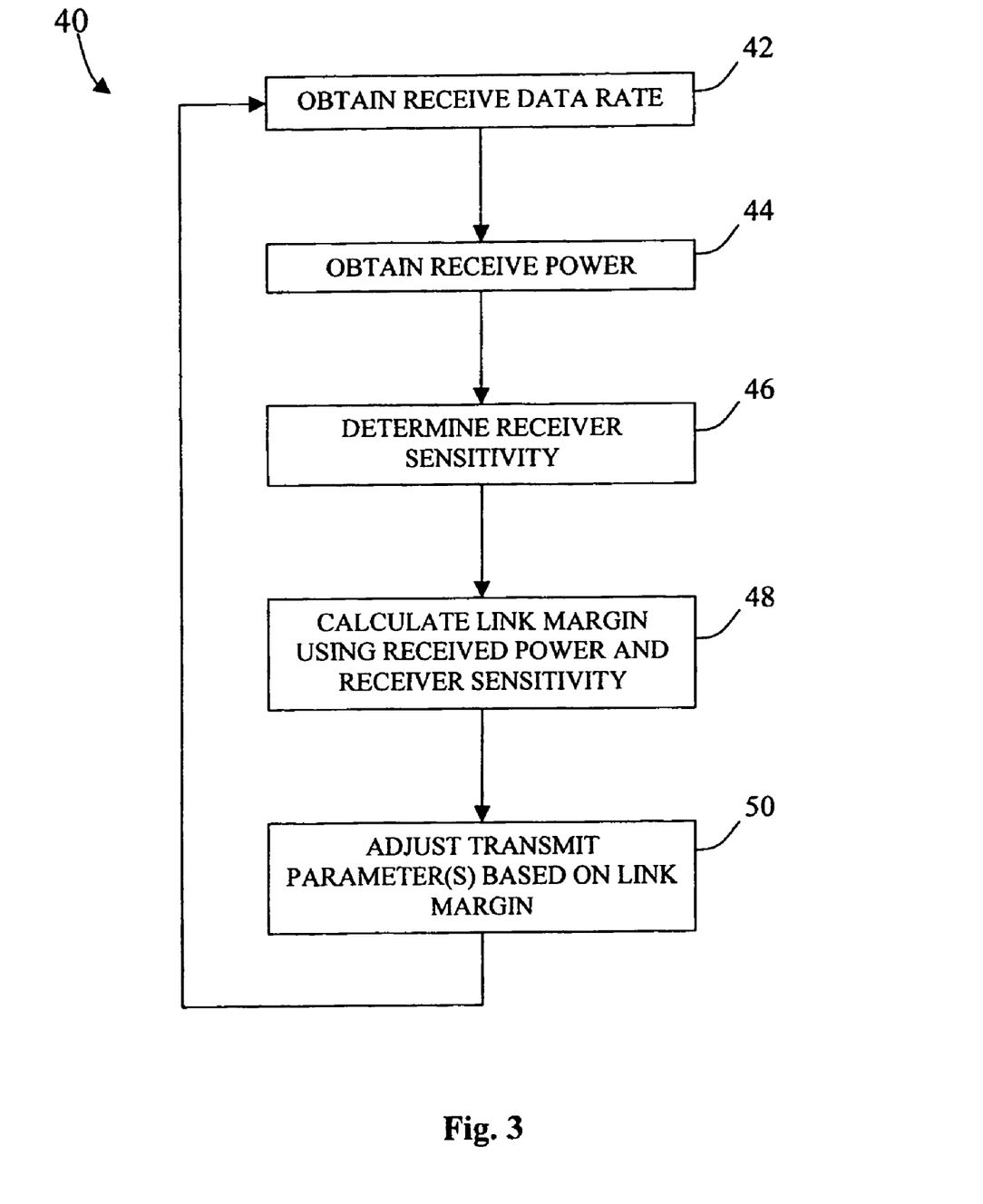
FIG. 3 is a flowchart illustrating an example method for use in controlling transmit parameters within a wireless device in accordance with an embodiment of the present invention.

FIG. 3 is a flowchart illustrating an example method 40 for use in controlling transmit parameters within a wireless device in accordance with an embodiment of the present invention. First, the data rate of a signal received by the wireless device is obtained (block 42). This signal may include, for example, a beacon signal received from a wireless access point (when implemented within a wireless network) or some other form of control signal. A received power level indication is then obtained for the wireless device (block 44). Any form of received power level indication may be used. In an IEEE 802.11 compatible device, for example, an RPL value may be obtained as the received power level indication. A receiver sensitivity may then be determined for the communication device based on the receive data rate previously obtained (block 46). This may be performed using, for example, a look up table, an equation, or in some other manner. Other methods for determining receiver sensitivity may alternatively be used.

Link margin is next calculated using the received power level indication and the receiver sensitivity (block 48). In at least one approach, the link margin is calculated as a difference between the received power level indication (e.g., RPL value) and the receiver sensitivity. Other techniques for calculating link margin (e.g., calculating a ratio, etc.) may alternatively be used. One or more transmit parameters may then be adjusted for the wireless device based on the calculated link margin (block 50). For example, in at least one approach, the transmit data rate of the wireless device is adjusted based on link margin. In another approach, the transmit power level is adjusted. In yet another approach, both transmit data rate and transmit power level are adjusted. Other transmit parameters and/or combinations of transmit parameters may also be adjusted based on calculated link margin. The method 40 may be repeated at, for example, predetermined times or predetermined intervals (or in some other manner) during device operation so that the transmit parameters may adapt over time to a possibly changing channel.

Figure 4:
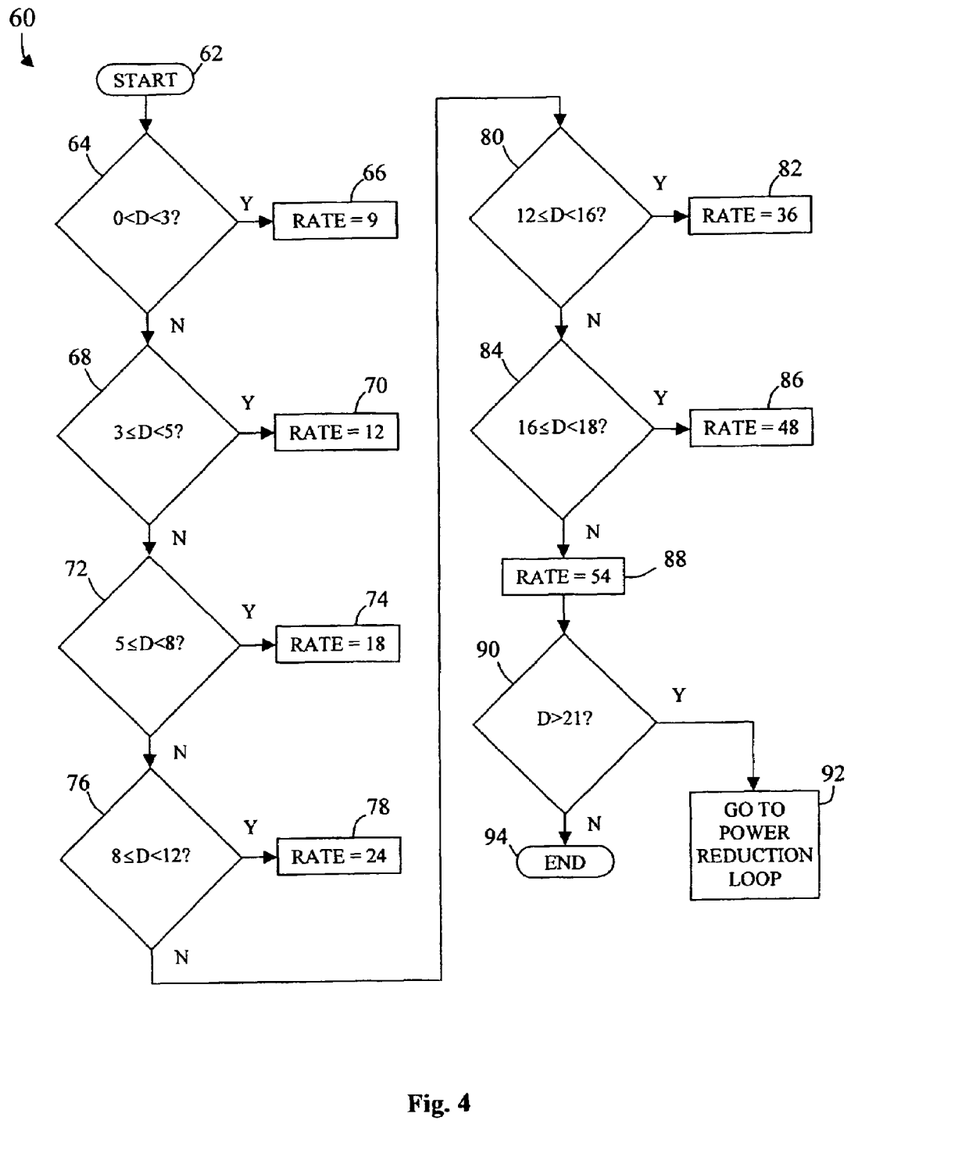
FIG. 4 is a flowchart illustrating an example method for use in selecting a transmit data rate in accordance with an embodiment of the present invention.

FIG. 4 is a flowchart illustrating an example method 60 for use in selecting a transmit data rate based on a link margin value (D) in accordance with an embodiment of the present invention. The method 60 may be used, for example, as part of the method 40 of FIG. 3 or within other transmit parameter control procedures. After the method 60 begins (block 62), it is first determined whether the link margin (D) falls within a first range 0<D<3 (block 64). If so, the transmit data rate is set to 9 Mega bits per second (Mbps) (block 66). If not, it is next determined whether the link margin falls within a second range 3≦D<5 (block 68). If so, the transmit data rate is set to 12 Mbps (block 70). If not, it is next determined whether the link margin falls within a third range 5≦D<8 (block 72). If so, the transmit data rate is set to 18 Mbps (block 74). If not, it is next determined whether the link margin falls within a fourth range 8≦D<12 (block 76). If so, the transmit data rate is set to 24 Mbps (block 78). If not, it is next determined whether the link margin falls within a fifth range 12≦D<16 (block 80). If so, the transmit data rate is set to 36 Mbps (block 82). If not, it is next determined whether the link margin falls within a sixth range 16≦D<18 (block 84). If so, the transmit data rate is selected as 48 Mbps (block 86). If not, the transmit data rate is selected as 54 Mbps (block 88) and it is then determined whether the link margin falls within a seventh range D>21 (block 90). If so, a power reduction loop is initiated to reduce the transmit power level of the wireless device (block 92). If not, the method 60 is terminated (block 94).

In the method 60 described above, the individual transmit data rates (i.e., 6, 9, 12, 18, 24, 36, 48, and 54 Mbps) that are used are the data rates that are specified within the IEEE 802.11a wireless networking standard. It should be appreciated that a similar approach may be used in systems using other wireless standards and other data rates. In IEEE 802.11a, 54 Mbps is the maximum specified data rate. However, the method 60 does not have to use the maximum data rate specified in the corresponding standard. For example, it may be determined that a wireless device implementing IEEE 802.11a is not to exceed 24 Mbps (e.g., if link distances are known to be long). In such a case, the method 60 may be modified so that 24 Mbps (block 78) is the maximum data rate. The method 60 may then go to the power reduction loop when, for example, D>15. In at least one embodiment of the invention, the maximum data rate may be a user specified value. As will be appreciated, the number of link margin ranges, the boundaries of the individual ranges, and the specific data rate values may vary from implementation to implementation.

Figure 5:
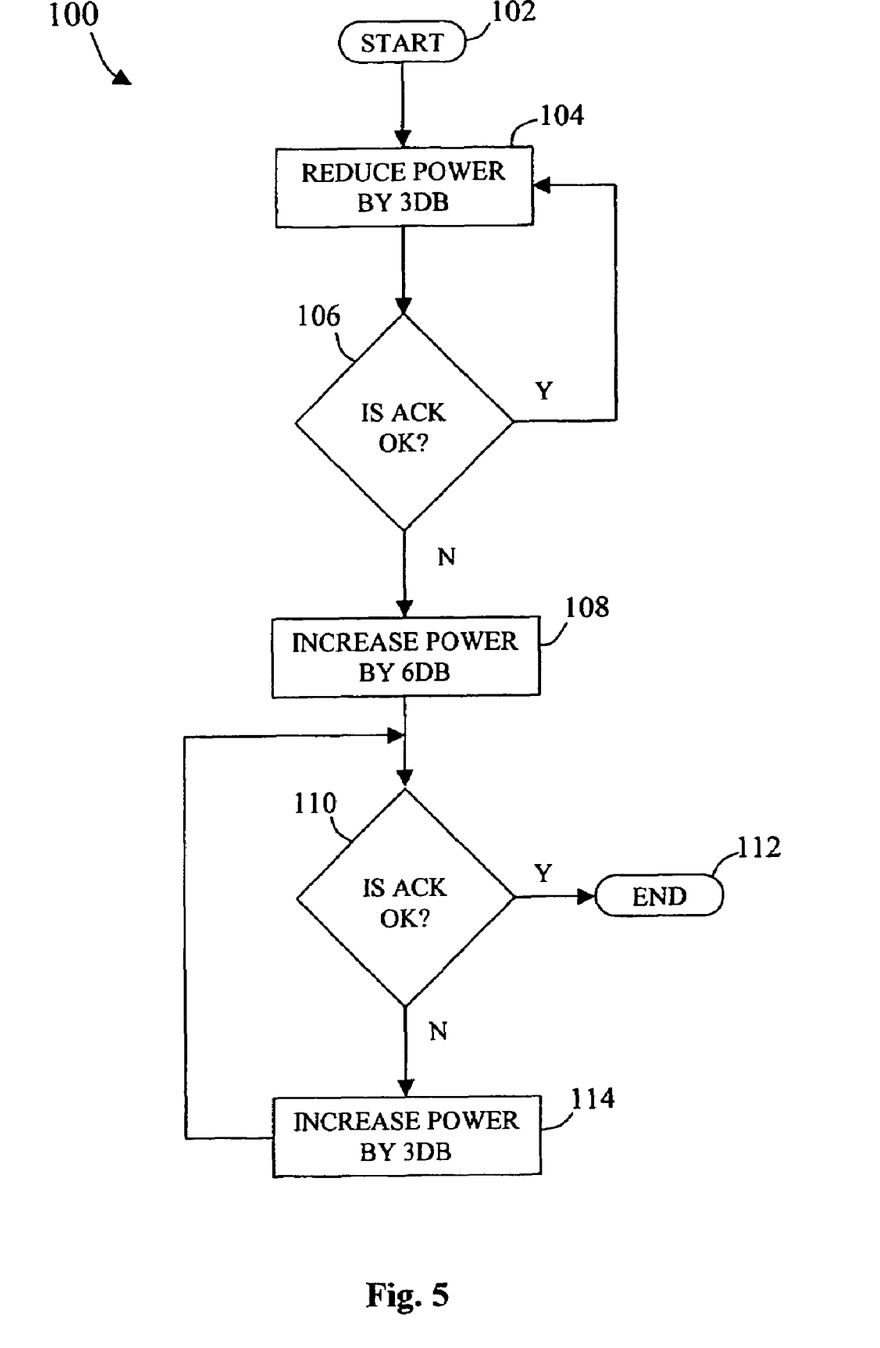
FIG. 5 is a flowchart illustrating an example method for implementing a transmit power reduction loop in a wireless device in accordance with an embodiment of the present invention.

FIG. 5 is a flowchart illustrating an example method 100 for implementing a transmit power reduction loop in a wireless device in accordance with an embodiment of the present invention. The method 100 may be used, for example, as part of the method 60 of FIG. 4 or within other transmit parameter control procedures. After the method 100 has initiated (block 102), the transmit power level of the subject communication device is reduced by 3 deciBels (dB) (block 104). A signal is transmitted and it is determined whether an acknowledgement signal (ACK) has been received in response to the transmission (block 106). If so, the transmit power level is again reduced by 3 dB (block 104) and the ACK is again checked (block 106). This is repeated until an ACK is no longer detected (block 106). At this point, the transmit power level is increased by 6 dB (block 108). A signal is again transmitted and it is determined whether an acknowledgement signal (ACK) is properly returned (block 110). If so, the method 100 is terminated with the present transmit power level (block 112). If an ACK is not returned, the transmit power level is increased by 3 dB (block 114), another signal is transmitted, and the ACK is again checked (block 110). This is repeated until an ACK signal is received by the wireless device, at which time the method 100 terminates (block 112). It should be appreciated that the method 100 of FIG. 5 is merely an example of one type of power reduction loop that may be implemented in accordance with the present invention. Many alternative power reduction schemes may also be used.

The principles of the present invention may be implemented within any wireless system including, for example, wireless networks, wireless communication systems, and/or others. The inventive principles may also be used in wireless systems following any of a wide range of different wireless standards.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method comprising:
  receiving a signal from a remote wireless entity;
  first determining a data rate and a receive power of said received signal;
  second determining a receiver sensitivity at said data rate;
  calculating a link margin using said receiver sensitivity and said receive power;
  when said calculated link margin is within a first range, selecting a first transmit data rate for use in transmitting data to said remote wireless entity;
  when said calculated link margin is within a second range, selecting a second transmit data rate for use in transmitting data to said remote wireless entity, said second transmit data rate being different from said first transmit data rate; and
  when said calculated link margin is greater than a threshold value:
    selecting a third transmit data rate for use in transmitting data to said remote wireless entity, said third transmit data rate being different from said first and second transmit data rates;
    reducing a transmit power level for use in transmitting data to said remote wireless entity by a first amount to form a reduced transmit power level;
    transmitting a signal to said remote wireless entity at said reduced transmit power level and said third transmit data rate;

third determining whether an acknowledgement signal has been received from said remote wireless entity in response to said transmitted signal; and when an acknowledgement signal has been received in response to said transmitted signal, repeating reducing, transmitting, and third determining until an acknowledgement signal is not received in response to a transmitted signal;

wherein said threshold value is greater than an upper limit of said first range and an upper limit of said second range.

2. The method of claim 1, further comprising:
when said calculated link margin is within a third range, selecting a fourth transmit data rate for use in transmitting data to said remote wireless entity, said fourth transmit data rate being different from said first, second, and third transmit data rates, wherein said threshold value is greater than an upper limit of said third range.

3. The method of claim 1, wherein:
calculating includes determining a difference between said receive power of said received signal and said receiver sensitivity.

4. The method of claim 1, wherein:
said third transmit data rate is a maximum transmit data rate.

5. The method of claim 1, further comprising:
when an acknowledgement signal is not received in response to said transmitted signal:
increasing said transmit power level by a second amount to form an increased transmit power level;
transmitting a signal at said increased transmit power level and said third transmit data rate; and
determining whether an acknowledgement signal is successfully received in response to said transmitted signal having said increased transmit power level.

6. The method of claim 5, further comprising:
when an acknowledgement signal is not received in response to said transmitted signal having said increased transmit power level:
increasing said transmit power level by said first amount to form a new increased transmit power level;
transmitting a signal at said new increased transmit power level and said third transmit data rate; and
determining whether an acknowledgement signal has been received in response to said transmitted signal having said new increased transmit power level.

7. The method of claim 6, further comprising:
when an acknowledgement signal has not been received in response to said transmitted signal having said new increased transmit power level, repeating increasing, transmitting, and determining until an acknowledgement signal is received.

8. A wireless device comprising:
a wireless transceiver;
a link margin determination unit to determine a link margin associated with a signal received by the wireless transceiver, using a receive power level of said signal received by the wireless transceiver;
a transmit data rate determination unit to select a transmit data rate for the wireless transceiver based on said link margin determined by said link margin determination unit, wherein said transmit data rate determination unit selects said transmit data rate by determining which of a plurality of link margin ranges said link margin falls within, each range in said plurality of ranges corresponding to a different transmit data rate; and a transmit power determination unit to determine a transmit power level for the wireless transceiver, wherein said transmit power determination unit, when said link margin determined by said link margin determination unit is greater than a threshold value, operates to:
reduce the transmit power level of the wireless transceiver in predetermined decrements until a signal transmitted by the wireless device no longer receives an acknowledgement from a remote wireless entity;
when a signal transmitted by the wireless device no longer receives an acknowledgement from a remote wireless entity, increase the transmit power level of the wireless device by a first amount to form an increased transmit power level; and
determine whether a signal transmitted by the wireless device at said increased transmit power level receives an acknowledgement from the remote wireless entity.

9. The wireless device of claim 8, wherein:
when said signal transmitted at said increased transmit power level does not receive an acknowledgement from said remote wireless entity, said transmit power determination unit is to increase the transmit power level of the wireless device in predetermined increments until a signal transmitted by the wireless device receives an acknowledgement from said remote wireless entity.

10. The wireless device of claim 8, wherein:
said transmit data rate determination unit selects a maximum data rate when said link margin exceeds said predetermined value.

11. The wireless device of claim 8, wherein:
said link margin determination unit determines said link margin by calculating a difference between said received power level of said signal and a receiver sensitivity.

12. The wireless device of claim 8, wherein:
said receiver sensitivity is estimated based upon a data rate of a signal received by said wireless transceiver.

13. An article comprising a computer readable storage medium having instructions stored thereon that, when executed by a computing platform, result in:
first determining a data rate and a receive power of a signal received from a remote wireless entity;
second determining a receiver sensitivity at said data rate;
calculating a link margin using said receiver sensitivity and said receive power;
when said calculated link margin is within a first range, selecting a first transmit data rate for use in transmitting data to said remote wireless entity;
when said calculated link margin is within a second range, selecting a second transmit data rate for use in transmitting data to said remote wireless entity, said second transmit data rate being different from said first transmit data rate; and
when said calculated link margin is greater than a threshold value:
selecting a third transmit data rate for use in transmitting data to said remote wireless entity, said third transmit data rate being different from said first and second transmit data rates;
reducing a transmit power level for use in transmitting data to said remote wireless entity by a first amount to form a reduced transmit power level;

transmitting a signal to said remote wireless entity at said reduced transmit power level and said third transmit data rate;

third determining whether an acknowledgement signal has been received from said remote wireless entity in response to said transmitted signal; and when an acknowledgement signal has been received in response to said transmitted signal, repeating reducing, transmitting, and third determining until an acknowledgement signal is not received in response to a transmitted signal;

wherein said threshold value is greater than an upper limit of said first range and an upper limit of said second range.

14. The article of claim 13, wherein:

calculating includes determining a difference between said receive power and said receiver sensitivity.

15. The article of claim 13, wherein said instructions, when executed, further result in:

when an acknowledgement signal has not been received in response to said transmitted signal:

increasing said transmit power level by a second amount to form an increased transmit power level;

transmitting a signal at said increased transmit power level and said third transmit data rate; and determining whether an acknowledgement signal is successfully received in response to said transmitted signal having said increased transmit power level.

16. The article of claim 15, wherein said instructions, when executed, further result in:

when an acknowledgement signal has not been received in response to said transmitted signal having said increased transmit power level:

increasing said transmit power level by said first amount to form a new increased transmit power level;

transmitting a signal at said new increased transmit power level and said third transmit data rate; and determining whether an acknowledgement signal has been received in response to said transmitted signal having said new increased transmit power level.

17. The article of claim 16, wherein said instructions, when executed, further result in:

when an acknowledgement signal has not been received in response to said transmitted signal having said new increased transmit power level, repeating increasing, transmitting, and determining until an acknowledgement signal is received.

18. A wireless device comprising:

at least one dipole antenna;

a wireless transceiver coupled to said at least one dipole antenna;

a link margin determination unit to determine a link margin associated with the wireless transceiver using a power level of a signal received by the wireless transceiver;

a transmit data rate determination unit to select a transmit data rate for the wireless transceiver based on said link margin determined by said link margin determination unit, wherein said transmit data rate determination unit selects said transmit data rate by determining which of a plurality of link margin ranges said link margin falls within, each range in said plurality of ranges corresponding to a different transmit data rate; and a transmit power determination unit to determine a transmit power level for the wireless transceiver, wherein said transmit power determination unit, when said link margin determined by said link margin determination unit is greater than a threshold value, operates to:

reduce the transmit power level of the wireless transceiver in predetermined decrements until a signal transmitted by the wireless device no longer receives an acknowledgement from a remote wireless entity;

when a signal transmitted by the wireless device no longer receives an acknowledgement from a remote wireless entity, increase the transmit power level of the wireless device by a first amount to form an increased transmit power level; and determine whether a signal transmitted by the wireless device at said increased transmit power level receives an acknowledgement from the remote wireless entity.

19. The wireless device of claim 18, wherein:

when said signal transmitted at said increased transmit power level does not receive an acknowledgement from said remote wireless entity, said transmit power determination unit is to increase the transmit power level of the wireless device in predetermined increments until a signal transmitted by the wireless device receives an acknowledgement from said remote wireless entity.

20. The wireless device of claim 18, wherein:

said at least one dipole antenna includes multiple dipole antennas in an antenna diversity arrangement.

* * * * *